Patented Sept. 14, 1926.

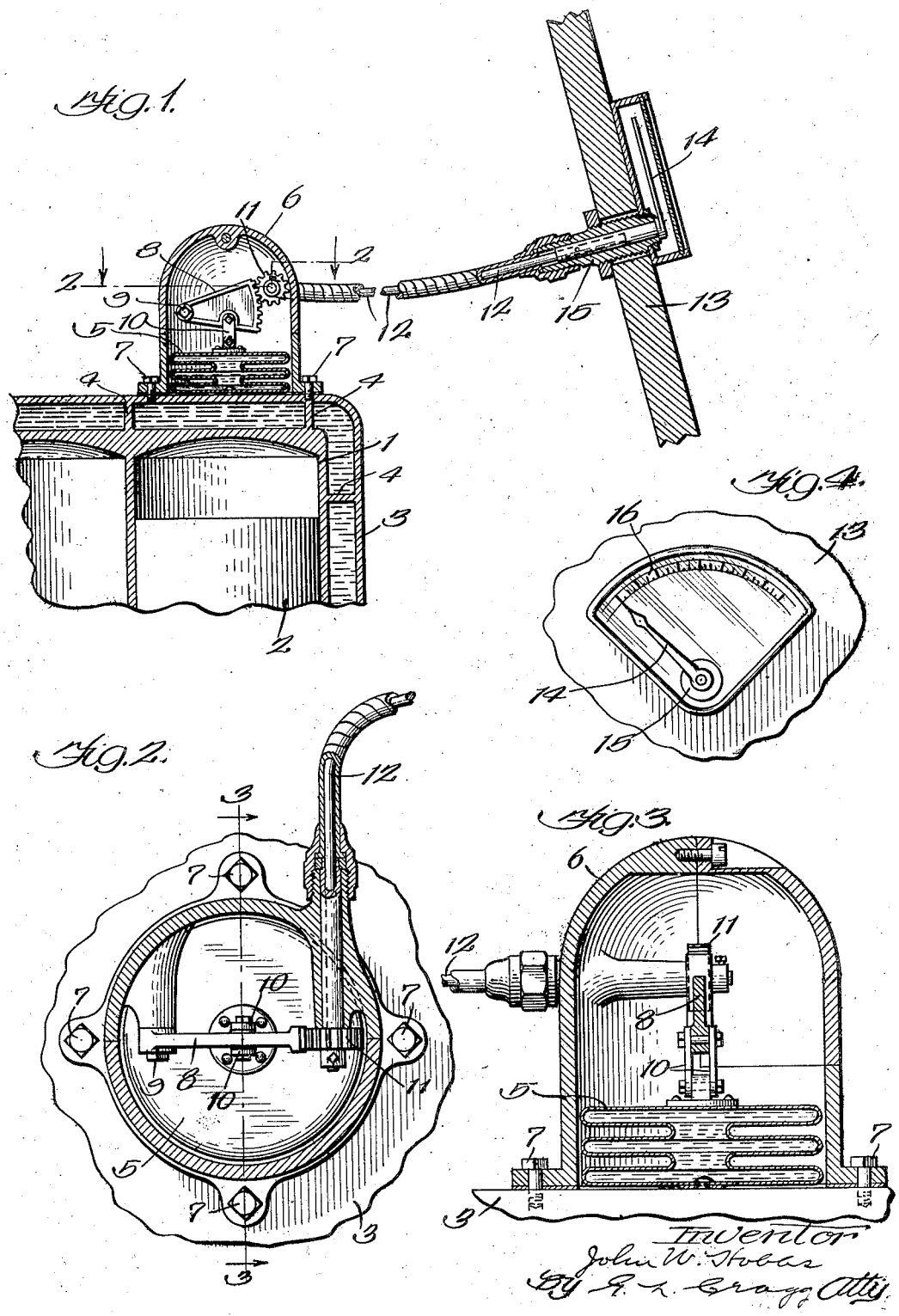

1,599,527

UNITED STATES PATENT OFFICE.

JOHN W. HOBBS, OF DAVENPORT, IOWA, ASSIGNOR TO PYRENE MANUFACTURING COMPANY, OF NEWARK, NEW JERSEY, A CORPORATION OF DELAWARE.

APPARATUS FOR MEASURING THE TEMPERATURE OF INTERNAL-COMBUSTION ENGINES.

Application filed March 10, 1920. Serial No. 364,711.

My invention relates to internal combustion engines which are cooled by means of air, water, or other fluid to prevent the pistons or other load operating elements from being bound or cramped within the cylinders or other explosive chambers of the engines. The invention has for its object the provision of means whereby the temperature of the cylinder or other explosive chamber of an internal combustion engine may be directly measured.

Hitherto fluid thermometers have been employed for the purpose of measuring the temperature of the cooling fluid. Such thermometers as these are difficult to read, especially at night, and serve to convey no warning in the event of the cooling fluid ceasing to function, it being possible for an internal combustion engine to run so hot as to damage itself without any indication of the abnormal temperature condition thereof. Moreover, when fluid thermometers are employed upon an automobile they are apt to be influenced by the temperature of the air to such an extent as to fail to give the correct indication of the temperature of the cooling fluid. There are many other disadvantages pertaining to temperature measuring equipment now in existence as will be manifest to those skilled in the art.

In practicing my invention I employ a thermostatic element in metallic connection with the explosive chamber of the engine to be directly influenced by its heat, a flexible shaft connected with said thermostatic element to be actuated thereby, an indicator board to which the flexible shaft extends, and a temperature indicating pointer mounted to move upon the indicator board in front of the face thereof and connected with the flexible shaft to be moved thereby.

In the preferred embodiment of the invention I employ a segmental toothed gear mounted to oscillate, a link attached to and operated by the thermostatic element and connected with the segmental gear between the pivot and teeth of this gear, a pinion in mesh with said gear, and a flexible shaft connected with the pinion to be oscillated thereby, this flexible shaft being connected to oscillate the pointer to indicate the temperature of the engine.

I will explain my invention more fully by reference to the accompanying drawing showing the preferred embodiment thereof and in which Fig. 1 illustrates a portion of an internal combustion hydrocarbon engine entering into the power plant of an automobile, this figure also illustrating the dashboard of an automobile which constitutes one form of indicator board embraced in the invention; Fig. 2 is a sectional view on line 2—2 of Fig. 1; Fig. 3 is a sectional view on line 3—3 of Fig. 2; and Fig. 4 is a view looking at the front of the indicator or dash board showing the indicating mechanism upon the front face of such board.

Like parts are indicated by similar characters of reference throughout the different figures.

The internal combustion engine illustrated is of the reciprocating type whose explosive chambers are in the form of engine cylinders 1 within which pistons 2 reciprocate. The engine shown is of the water cooled type, there being an enclosing jacket 3 spaced apart from the cylinders of the engine and which, in carrying out my invention, is brought into metallic connection with the engine cylinders by means of metallic bridge portions 4. Any suitable form of thermostatic element is placed in metallic connection with the engine cylinders. The thermostatic element illustrated includes metal formed into a bellows structure 5, filled with gas or liquid, and mounted to have metallic contact with the jacket 3 and therefore with the engine cylinders 1 through the intermediation of the bridge pieces 4. In order that the thermostatic element may not be unduly influenced by the temperature of the surrounding air I enclose such element within a hood 6, that may be metallic, suitable mounting bolts 7 passing through the base flange of the hood into the jacket 3. A segmental toothed gear 8 is mounted upon and within the hood 6, being pivoted at 9 to oscillate. A link 10 is pivotally attached at its lower end to the top portion of the thermostatic element. The upper end of this link is pivotally attached to the segmental gear between the pivot of this gear and the teeth of the gear whereby a given movement of the thermostat is accompanied by an amplified movement at the toothed portion of the gearing. A pinion 11 is in mesh with the gear and is fixed upon one end of a shaft 12 which is made flexible in order that it may be extended through an irregular course to and through the indicator board 13 which, in an automobile, would be the dashboard. The rear end of the flexible shaft is connected with the pointer 14 which is journaled within a bearing 15 carried by the board 13 to oscillate before the front face of the board. The pointer may be provided with a scale 16 marked in temperature units. As the temperature of the engine rises the pointer will swing in a clockwise direction and as such temperature recedes the pointer will move in a counter clockwise direction, all through the intermediation of the flexible shaft and gearing which is interposed between the pointer and the thermostatic element whose movement is directly controlled by the heat of the engine itself.

While the flexible shaft illustrated is preferably oscillated I do not wish to be limited to the manner in which the shaft is moved in order to effect the proper indicating movements of the pointer.

Having thus described my invention I claim as new and desire to secure by Letters Patent the following:—

1. In a temperature measuring apparatus for internal combustion engines, the combination with an internal combustion engine; of a thermostatic element in metallic connection with the explosive chamber of the engine whereby said element is directly influenced by its heat; a segmental toothed gear mounted to oscillate; a link attached to and operated by the thermostatic element and connected with the segmental gear between the pivot and teeth of this gear; a pinion in mesh with said gear; a flexible shaft connected with the pinion to be oscillated thereby; an indicator board to which the flexible shaft extends; and a temperature indicating pointer mounted to oscillate upon the indicator board in front of the face thereof and connected with the flexible shaft to be oscillated thereby.

2. In a temperature measuring apparatus for internal combustion engines, the combination with an internal combustion engine; of a thermostatic element assembled with the engine cylinder unit to be directly influenced by its heat; a segmental toothed gear mounted to oscillate and having means by which it is actuated by said thermostatic element; a pinion in mesh with said gear; a flexible shaft connected with the pinion to be oscillated thereby; an indicator board to which the flexible shaft extends; and a temperature indicating pointer mounted to oscillate upon the indicator board in front of the face thereof and connected with the flexible shaft to be oscillated thereby.

3. In a temperature measuring apparatus for internal combustion engines in combination, a heat responsive element adapted to be assembled with the engine cylinder unit to be directly influenced by its heat, including a member movable in response to heat changes and mechanism for converting such movement into a rotary movement; a temperature indicating device adapted to be mounted on a dashboard, and means including a flexible shaft connecting it with said heat responsive element.

4. In a temperature measuring apparatus for internal combustion engines in combination, a heat responsive element adapted to be assembled with the engine cylinder unit to be directly influenced by its heat, including a member movable in response to heat changes and mechanism for converting such movement into a rotary movement; a temperature indicating device adapted to be mounted on a dashboard, and means for transmitting said rotary movement from said engine to said indicating device.

In witness whereof, I hereunto subscribe my name this 26th day of February A. D., 1920.

JOHN W. HOBBS.